INVENTORS
IRVING FEINBERG
JACK LEE LANGDON
CARL LEE SITLER

BY Theodore E. Galanthay
AGENT

Oct. 10, 1972 I. FEINBERG ET AL 3,697,318

MONOLITHIC INTEGRATED STRUCTURE INCLUDING FABRICATION THEREOF

Original Filed May 23, 1967 17 Sheets-Sheet 5

Oct. 10, 1972 I. FEINBERG ET AL 3,697,318

MONOLITHIC INTEGRATED STRUCTURE INCLUDING FABRICATION THEREOF

Original Filed May 23, 1967 17 Sheets-Sheet 8

3,697,318
MONOLITHIC INTEGRATED STRUCTURE INCLUDING FABRICATION THEREOF

Irving Feinberg, Poughkeepsie, and Jack L. Langdon and Carl L. Sitler, Wappingers Falls, N.Y., assignors to International Business Machines Corporation, Armonk, N.Y.

Original application May 23, 1967, Ser. No. 640,610, now Patent No. 3,539,876, dated Nov. 10, 1970. Divided and this application Dec. 12, 1969, Ser. No. 889,807
Int. Cl. B44d *1/18*; H01b *13/00*; H05k *3/00*
U.S. Cl. 117—212 5 Claims

ABSTRACT OF THE DISCLOSURE

This invention relates generally to monolithic integrated structures including the fabrication thereof and, more particularly, to a monolithic integrated structure that is used to provide a multiplicity of various circuit interconnections so as to permit more than one circuit to be made for each structure. Many logic type integrated structures can be fabricated from a single master slice configuration which contains a number of components in a pattern favorable to the formation of any selected logic circuit from a class of many such circuits. Additionally, fabrication techniques are described for facilitating formation of the integrated chip which include mask alignment techniques, chip testing techniques, chip identification, process step identification, engineering change number identification, etc.

CROSS REFERENCES TO RELATED APPLICATIONS OR PATENTS

This is a divisional application of co-pending U.S. patent application Ser. No. 640,610 filed on May 23, 1967, now U.S. Pat. No. 3,539,876, and assigned to the assignee of this application.

(1) Ser. No. 364,834, filed Feb. 24, 1964, now Pat. No. 3,321,441, investors, Fred Barson and Walter E. Mutter.

(2) Ser. No. 376,066, filed June 18, 1964, now Pat. No. 3,343,049, inventors, Fred Barson and William H. Miller.

(3) Ser. No. 428,733, filed January 28, 1965, now Pat. No. 3,369,991, inventors, Peter D. Davidse and Leon I. Maissel.

(4) Ser. No. 465,034, "Circuit Structure and Method," filed June 18, 1965, now Pat. No. 3,429,040, inventor, Lew Miller.

(5) Ser. No. 539,210, "Monolithic Integrated Structure Including Fabrication and Package Therefor," filed Mar. 31, 1966, now Pat. No. 3,508,209, inventors, Benjamin Agusta et al.

(6) Ser. No. 606,939, "Digital Circuit With Anti-Saturation Collector Load Network," filed Jan. 3, 1967, now Pat. No. 3,505,535, inventor, Joseph R. Cavallere.

(7) Ser. No. 607,923, "Method for Etching an Opening in an Insulating Layer Without Forming Pinholes Therein," filed Jan. 9, 1967, now Pat. No. 3,518,084, inventors, Fred Barson et al.

(8) "Current Switch," U.S. Pat. 2,964,652 to Yourke.

BACKGROUND OF THE INVENTION

(1) Field of the invention

This invention relates generally to monolithic semiconductor integrated structures including the fabrication thereof, and, more particularly, to monolithic integrated logic structures that can be readily mounted onto a module for use in machines such as computers, etc.

(2) Description of the prior art

Recently, the fabrication of monolithic integrated semiconductor circuits, preferably of silicon, has become more important in producing electronic equipment that requires, for competitive reasons, low cost integrated devices. The current trend in making integrated devices is to use the so-called "planar technology" wherein all diffusions are carried out on one surface of the semiconductor structure. In the manufacture of integrated devices using the "planar technology," the "master slice concept" became important in permitting the fabrication of integrated circuits of many types from a single "master slice." Problems were encountered in selecting the proper master slice configuration which would provide the flexibility desired for making a number of desired electrical circuits. The proper location of components became an important consideration. Furthermore, fabrication techniques were needed to permit proper identification of the integrated chip, the completed step in the process of making the integrated, chip, the dicing of the integrated chip, etc.

SUMMARY OF THE INVENTION

Accordingly, it is an object of this invention to provide an improved monolithic integrated structure.

It is a further object of this invention to provide an improved fabrication method for making monolithic integrated devices.

DESCRIPTION OF THE PREFERRED EMBODIMENTS

In accordance with one embodiment of this invention, a monolithic semiconductor master slice structure comprises a monocrystalline semiconductor substrate and spaced terminal pad areas located about the peripheral portion of the structure. An excess number of active and possive components are located in the area defined by the pad areas thereby permitting several integrated circuits to be fabricated from the master slice structure by selecting and interconnecting the desired active and passive components.

In accordance with another embodiment of this invention, a monolithic integrated semiconductor chip comprises a monocrystalline semiconductor substrate having spaced terminal pads located about the peripheral portion of the chip. Active and passive components are located in the semiconductor area defined by the terminal pads. Metal conductive paths electrically interconnect less than all of said active and passive components located in the area defined by the terminal pads to specified terminal pads.

In accordance with still another embodiment of this invention, a resistor for a monolithic integrated semiconductor chip comprises a substrate of one type conductivity. A low resistance region of the opposite type conductivity is located in the substrate and along one surface portion thereof. A high resistance region of the same conductivity type as the low resistance region is located on the substrate and on the low resistance region. A surrounding region of the same conductivity type as the substrate and in contact therewith electrically isolates the high resistance region. A pair of spaced low resistivity regions is located in surface portions of the high resistance region. Each of the pair of spaced low resistivity regions is of the same conductivity type as the high resistance region and right angularly skewed with respect to the separated low resistance region. Ohmic contacts are provided to the pair of spaced low resistivity regions.

In accordance with still another embodiment of this invention, a process for fabricating a monolithic integrated semiconductor chip includes the formation of spaced terminal pads in a parallel-sided configuration. Two adjacent spaced pads located on each side of two opposite parallel sides of the chip are spaced further apart than the space between any other pair of adjacent pads. Metallized marks are formed 90° apart on at least one corner terminal pad for mask alignment purposes. Additionally metallized dicing mark indicators are formed adjacent the corner pads of the chip.

In accordance with another embodiment of this invention, a module package for monolithic integrated semiconductor structures comprises a dielectric substrate. A conductive land pattern is formed on a surface of the dielectric substrate. A plurality of pins for module connection penetrates the dielectric substrate and connects to the conductive land pattern. A monolithic integrated semiconductor chip is spaced from the surface of the dielectric substrate by means of terminal pads which are connected to the lands. Each of the plurality of pins is electrically connected to a terminal pad of the chip.

For a more detailed description of the environment in which the presently disclosed techniques are useful, refers to the parent patent application from which U.S. Pat. 3,539,876 matured.

The foregoing and other objects, features and advantages of the invention will be apparent from the following more particular description of the preferred embodiments of the invention, as illustrated in the accompanying drawings.

BRIEF DESCRIPTION OF THE FIGURES

FIG. 4′ is a diagrammatic representation illustrating FIG. 4A and FIG. 4B as left and right portions of FIG. 4;

FIG. 5′ is a diagrammatical view, in box form, showing the interrelationship of FIGS. 5A and 5B which together form the composite metallized pattern of FIG. 5;

FIG. 6′ is a diagrammatical view, in box form, showing the interrelationship of FIGS. 6A and 6B which together form the composite metallized master slice and configuration of FIG. 6;

THE SPECIFICATION

Fabrication method

Figure 1:
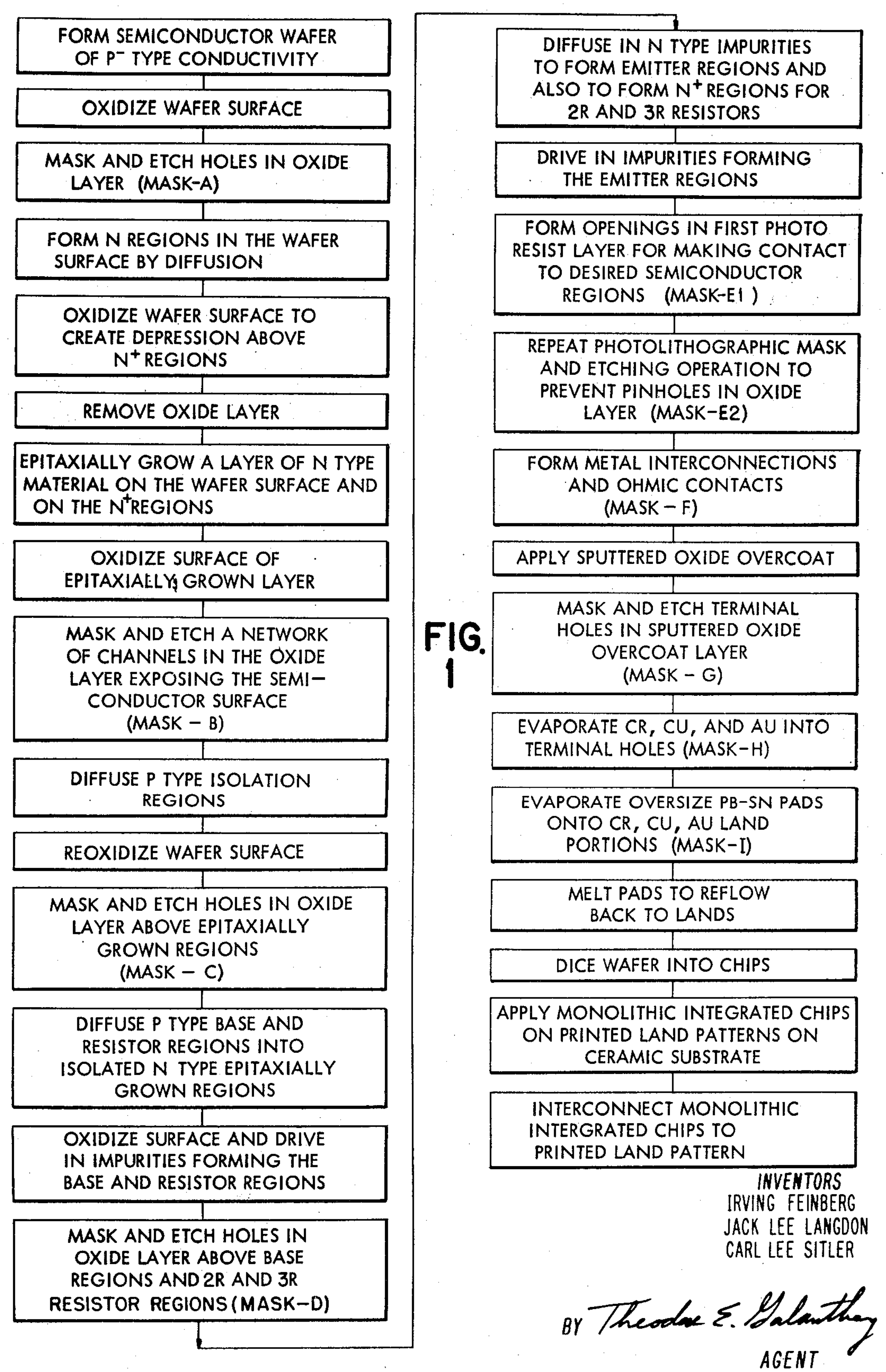
FIG. 1 is a flow diagram of the entire fabrication process for making the monolithic integrated structure and interconnecting it to a conductive land pattern formed on a ceramic substrate.

In discussing the semiconductor fabrication method, as illustrated by the flow diagram of FIG. 1, the usual terminology that is well known in the transistor field will be used. In discussing concentrations, references will be made to majority or minority carriers. By "carriers" is signified the free-holes or electrons which are responsible for the passage of current through a semiconductor material. Majority carriers are used in reference to those carriers in the material under discussion, i.e. holes in P type material or electrons in N type material. By use of the terminology "minority carriers" it is intended to signify those carriers in the minority, i.e., holes in N type material or electrons in P type material. In the most common type of semiconductor materials used in present day transistor structure, carrier concentration is generally due to the concentration of the "significant impurity," that is, impurities which impart conductivity characteristics to extrinsic semiconductor materials.

Although for the purpose of describing this invention reference is made to a semiconductor configuration wherein a P type region is utilized as the substrate and subsequent semiconductor regions of the composite semiconductor structure are formed in the conductivity type described, it is readily apparent that the same regions that are referred to as being of one conductivity type can be of the opposite type conductivity and furthermore, some of the operations which are described as diffusion operations can be made by epitaxial growth and some of the epitaxial growth regions can also be fabricated by diffusion techniques.

A wafer of P type conductivity preferably having a resistivity of 10 to 20 ohms-centimeter and a thickness of about 10 mils is used as the starting substrate. The substrate is preferably a monocrystalline silicon structure which can be fabricated by conventional techniques such as by pulling a rod-shaped silicon semiconductor member from a melt containing the desired impurity concentration and then slicing the pulled member into a plurality of wafers. The substrate preferably has a crystallographic orientation of about 2.5° off the $\langle 111 \rangle$ plane in the direction of the $\langle 110 \rangle$ plane to minimize pattern "shift" or "washout" after epitaxial growth. An oxide coating preferably of silicon dioxide and preferably having a thickness of approximately 6000 angstrom units is either thermally grown or deposited by pyrolytic deposition. Alternatively, an RF sputtering technique, as described in a patent application identified as Ser. No. 428,733, filed Jan. 28, 1965, in the names of Davidse and Maissel and assigned to the same assignee as this invention, can be used to form the silicon dioxide layer.

Figure 7:
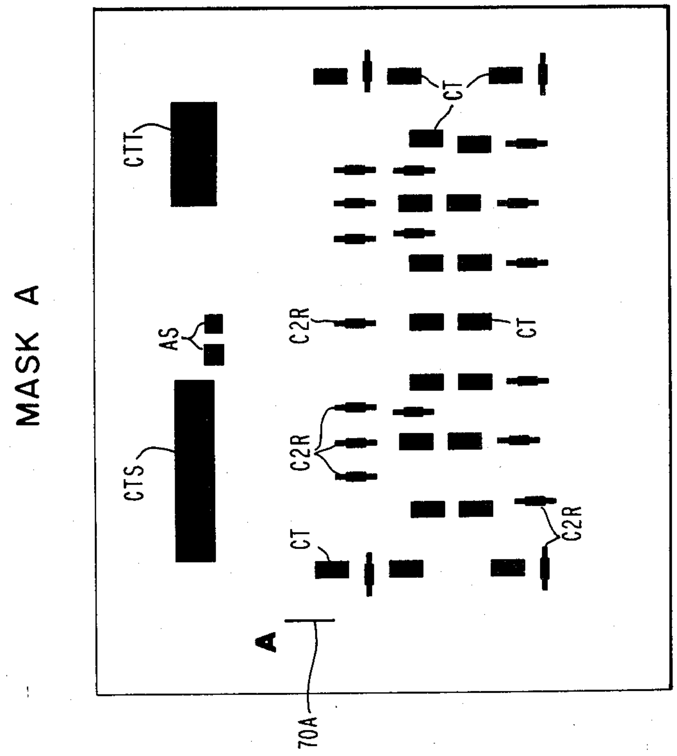

Using standard photolithographic masking and etching techniques a photoresist layer (not shown) is deposited onto the oxide layer located on the substrate surface. By using an appropriate mask (mask A as shown by FIG. 7) the photoresist layer serves as a mask to expose surface regions on the surface of the substrate by etching away the desired portions of the $SiO_2$ layer with a buffered HF solution. The photoresist layer is then removed to permit further processing.

A diffusion operation is carried out to diffuse into the exposed surface portions of the substrate $N^+$ type regions having a $C_0$ of $2 \times 10^{20}$ cm.$^{-3}$ of N type majority carriers. The sheet resistance of the $N^+$ regions is approximately 9.0 ohms per square, and the depth of each diffused region is approximately 90 micro inches. The surface oxide layer serves as a diffusion mask to prevent the $N^+$ diffusion operation from forming an $N^+$ region across the entire surface of the substrate. Preferably, the diffusion operation is carried out in an evacuated quartz capsule using degenerate arsneic doped silicon powder. As an alternative variation, each $N^+$ region can be formed by etching out regions in the $P^-$ type substrate and then subsequently epitaxially growing $N^+$ regions thereby using an etch and refill technique.

After the $N^+$ diffusion operation, an oxidation step is preferably performed which causes conversion of the $N^+$ surface regions into oxide (more than the remainder of the oxide masked surface of the substrate) and thereby creates a depression on each $N^+$ surface region to permit subsequent identification or location after epitaxial growth.

The oxide layer which is located on the entire surface of the substrate layer is removed with a buffered HF solution. A region of N type conductivity, preferably having a resistivity of 0.09 ohms per centimeter, is epitaxially grown on the surface of the substrate and over the depressed $N^+$ surface regions. The epitaxial region is an arsenic doped layer approximately 5.5±.2 microns thick. The depressions or recesses designating the location of the $N^+$ regions are now located on the surface of the epitaxial layer to facilitate subsequent photolithographic masking and etching operations. In actual device fabrication, the arsenic impurities in the $N^+$ regions, which are now buried, out diffuse about one micron during the epitaxial deposition.

An oxide layer approximately 4000 angstrom units thick is formed on the surface of the epitaxially grown region either by the thermal oxidation process, by pyrolytic deposition, or by RF sputtering techniques.

Figure 8:
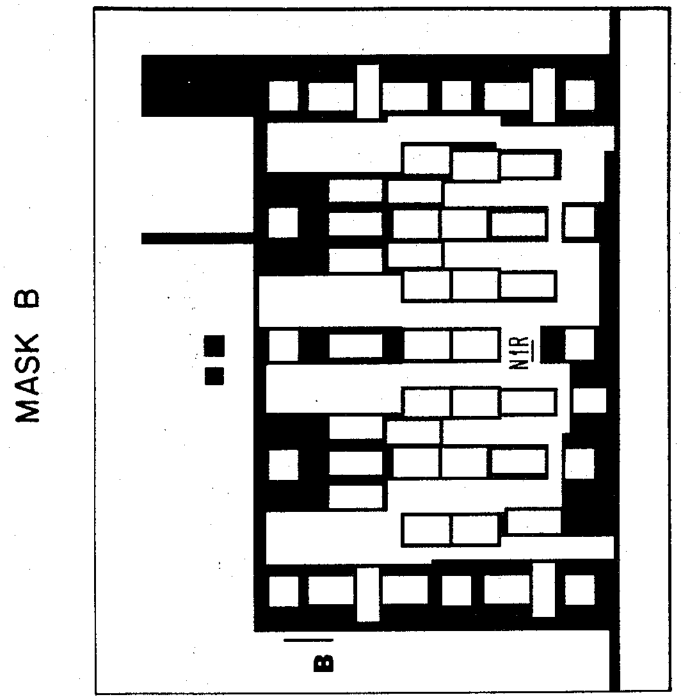
FIGS. 7, 8, 9, 10, 11, 12, 13, 14, 15 and 16 are planar views of the masks used in the fabrication process for making the monolithic integrated structure of the FIG. 6 embodiment of this invention.

An isolation pattern of channels are formed in the oxide layer by standard photolithographic masking and etching techniques using a photoresist layer as a mask and a buffered HF solution to remove the desired oxide portions. The mask used in conjunction with the photoresist layer is Mask B as shown in FIG. 8.

The structure is now prepared for the subsequent isolation diffusion operation. A $P^+$ diffusion operation is now carried out, preferably using a boron source, to form isolating $P^+$ regions and the $P^+$ under pass region (see FIG. 10) in the N type epitaxially grown region. The $P^+$ regions have a $C_0$ (surface concentration) of $2.2\times10^{20}$ cm.$^{-3}$ and a sheet resistance of 2.5 ohms per square. It is evident that the $P^+$ diffused regions have a low resistivity surface region which extends downwardly from the surface of the semiconductor structure and each $P^+$ region extends continuously from the $P^-$ type substrate region to the surface of the semiconductor structure. The depth of each $P^+$ region is approximately 300 micro inches.

Figure 9:
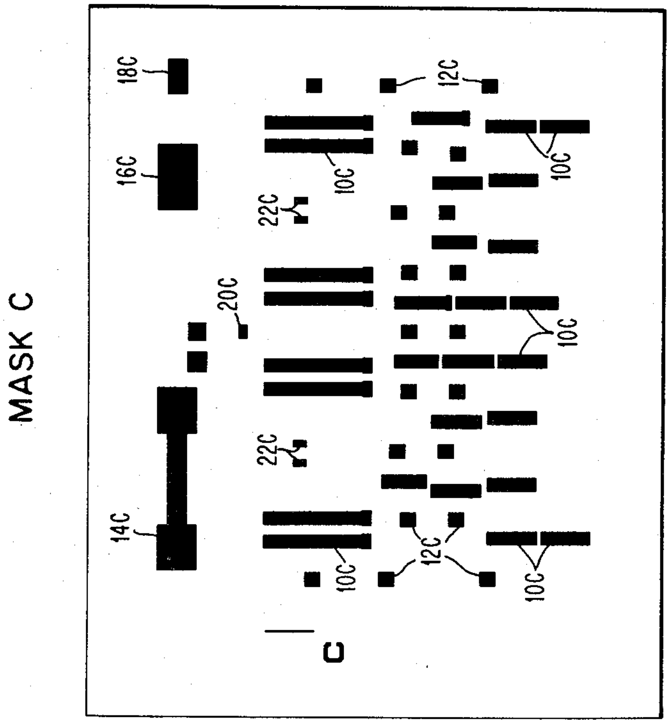

A reoxidation operation is now carried out and by using photolithographic masking and etching techniques (with mask C as shown in FIG. 9) holes are opened up in the oxide layer to permit a base or P-type diffusion. The P-type diffusion operation is carried out through the exposed semiconductor surface portions to form P-type base regions for each transistor T, P-type resistivity regions for each IR resistor, and the $P^{++}$ regions for the U underpass conductor. Boron is preferably used as the P-type impurity source to form regions having a $C_0$ of $1\times10^{19}$ atoms per cm.$^{-3}$, a sheet resistance of 150±5 ohms per square, and a depth of about 80 micro inches.

The P-type diffusion step is followed by a simultaneous reoxidation and drive-in operation. Another layer of $SiO_2$ is thereby grown on the substrate surface. During this heat treatment, the boron impurities are redistributed thereby increasing the junction depth and lowering the $C_0$.

Figure 10:
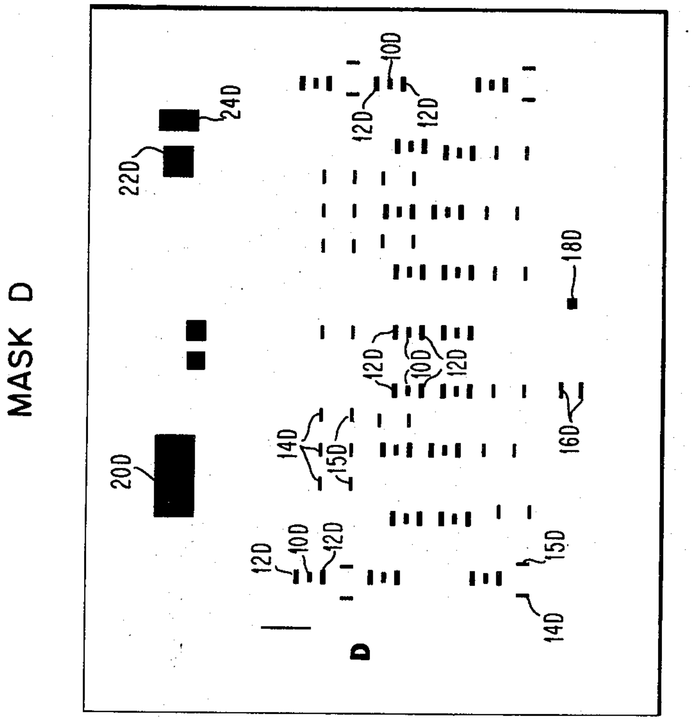

A photoresist coating is applied over the thermally grown oxide layer and by photolithographic masking and etching operations (using mask D as shown in FIG. 10) openings are formed in this oxide layer to permit $N^+$ emitter type regions (for each T transistor) to be formed by a subsequent diffusion operation, two $N^+$ contact regions for the collector of each T transistor, and $N^+$ contact regions for the 2R and 3R resistors. The two $N^+$ contact regions for each collector of the T transistor reduces the series resistance of the collector, $N^+$ emitter regions are formed in the P-type base region of each T transistor.

The $N^+$ regions are preferably formed using a phosphorous impurity source. The $N^+$ contact regions for the 2R resistors are located right angularly skewed with respect to narrow extension portions of the buried $N^+$ subcollector region. The $C_0$ is $2.5\times10^{21}$, the sheet resistance is 3.5 ohms per square, and the depth is approximately 71 microinches. A phosphosilicate glass layer is formed on the substrate surface due to the phosphorous diffusion operation. The base channel width of each T transistor is approximately 17 microinches due to "push out" of the base region after formation of the diffused emitter region. The emitter and base regions of each T transistor are formed over the buried $N^+$ region to permit this region to act as a bured low resistivity subcollector.

Figure 12:
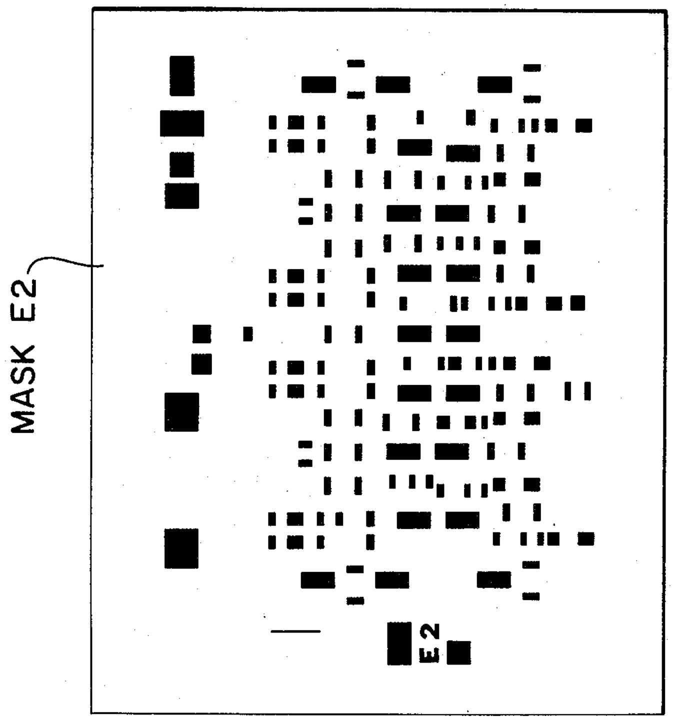
Figure 11:
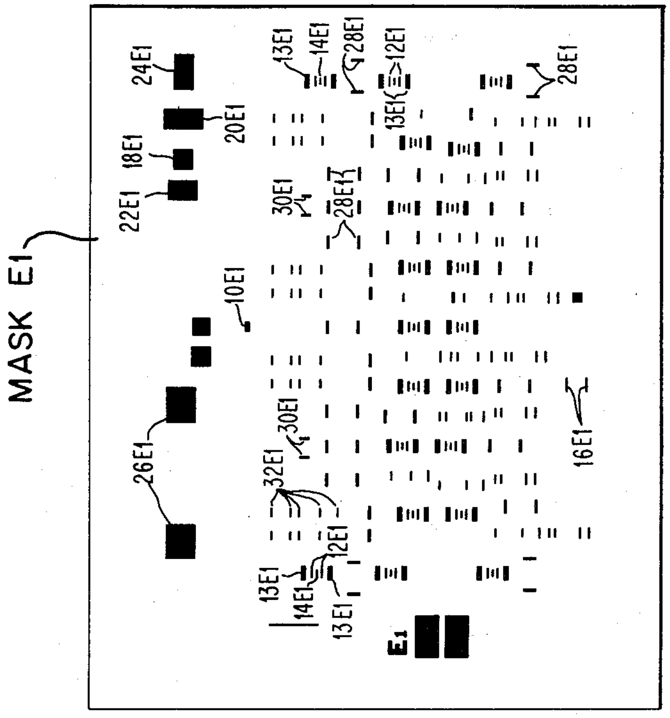

A drive-in operation is carried out using a nitrogen atmosphere. The purpose of carrying out a drive-in operation in a non-oxidizing atmosphere such as nitrogen is to maintain a high $\beta$ for the transistor T. If desired, following the emitter drive-in operation, a sputtered glass layer can be deposited on the phosphosilicate glass layer to protect the phosphosilicate glass layer which is needed for stability purposes as described in copending U.S. patent application Ser. No. 376,066, inventors, William H. Miller and Fred Barson, filed June 18, 1964 and assigned to the same assignee of this invention. Contact holes are opened up in the oxide layer in selected areas thereof by using two photoresist layers and two successive photolithographic masking and etching techniques (one for each layer using mask E1 as shown in FIG. 11 on the first photoresist layer and Mask E2 as shown in FIG. 12 on the second photoresist layer). The advantages of such a masking and etching process where the second mask also acts as a block out mask is clearly set forth in FIG. 3 of a copending patent application entitled "Method for Etching an Opening in an Insulating Layer Without Forming Pinholes Therein," filed Jan. 9, 1967, inventors, Fred Barson et al., and assigned to the same assignee of this invention. For example, the dimensions of the emitter contact hole is 0.7 x 0.2 mils, each base contact hole 0.2 x 1.0 mils, and each collector contact hole 0.5 x 1.4 mils.

Figure 13:
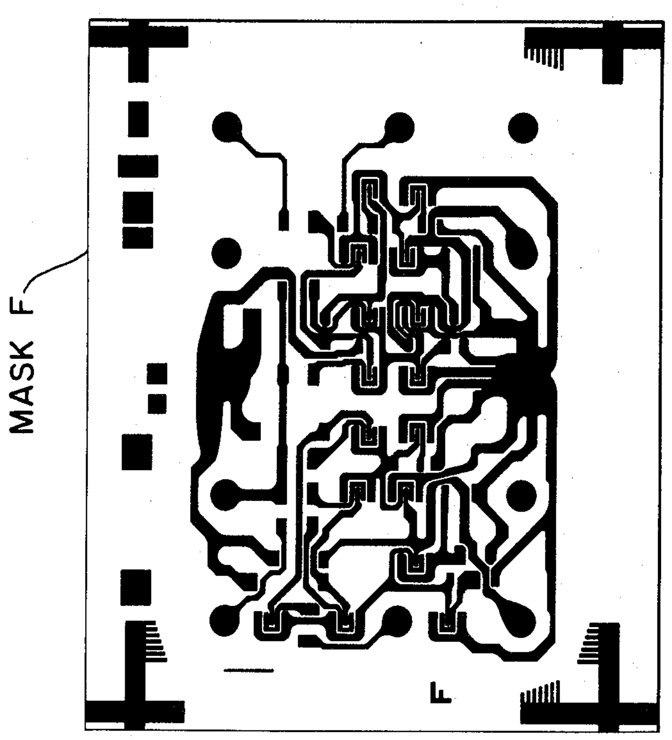

A layer of aluminum or other suitable metal such as molybdenum is evaporated over the entire wafer surface and portions of this layer are etched away to produce the desired interconnection pattern. An evaporated layer of aluminum with a thickness of several thousand angstrom units is useful to permit the formation of an interconnecting conductive path between components to thereby form the desired integrated circuit. A layer of photoresist is then applied to the wafer, dried, exposed, developed, and fixed. The aluminum interconnections are formed by a subtractive etching operation (with Mask F as shown in FIG. 13) using a warm solution of $H_3PO_4+HNO_3+H_2O$. The photoresist layer is stripped off and the wafer is cleaned and dried.

The wafers are sintered in a nitrogen atmosphere at a temperature of about 450° C. for a period of about 15 minutes to permit the aluminum to produce good ohmic contact to the contacted semiconductor regions of the wafer. Thus, ohmic contacts are formed to each of the components.

Figure 14:
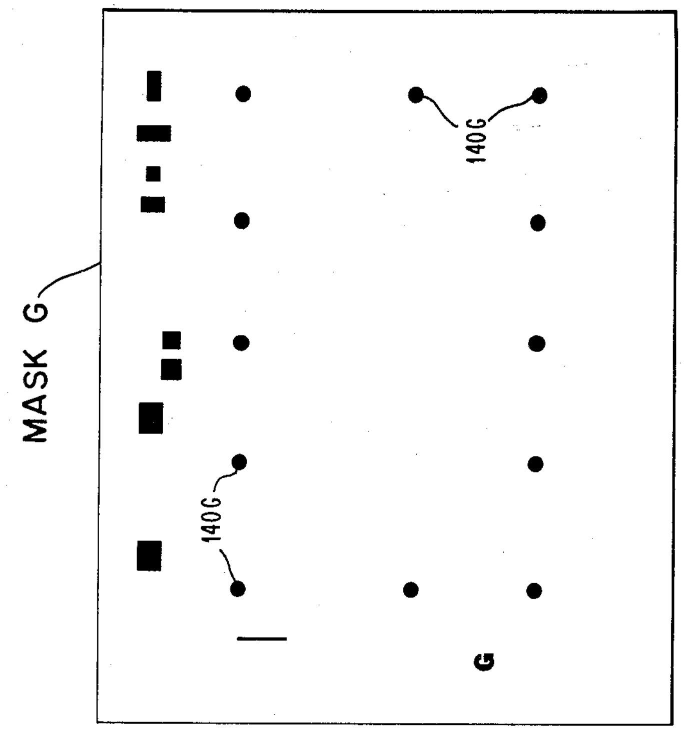

Subsequently, a sputtered or otherwise deposited insulating layer of $SiO_2$ or other form of glass material is formed on the entire wafer surface. This encapsulating layer is provided over the entire wafer surface after the aluminum land pattern is formed on the oxide layer. Openings are formed over the terminal portion of each land that is selected for pad P formation. This opening is made by conventional photolithographic masking and etching techniques using a photoresist layer as a mask (Mask G as shown in FIG. 14).

Figure 15:
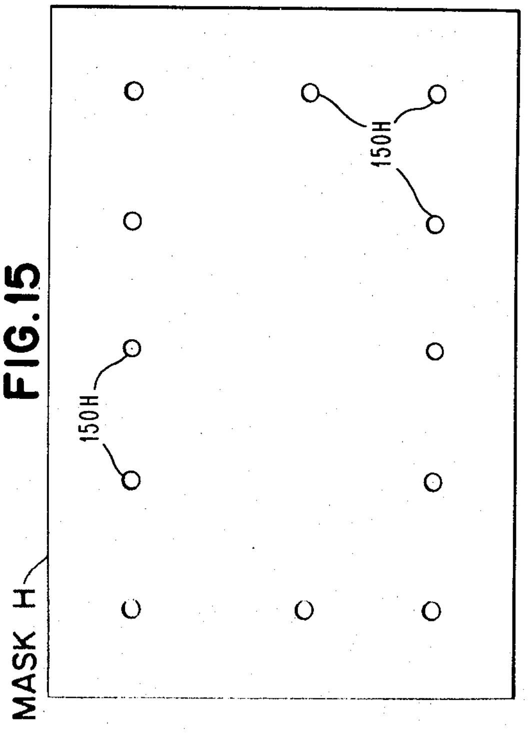

Successive layers of chromium, copper, and gold are deposited into and about the periphery of each opening formed by the previous photolithographic masking and etching operation. This is carried out using mask H as shown in FIG. 15 to permit terminal contact formation.

Figure 16:
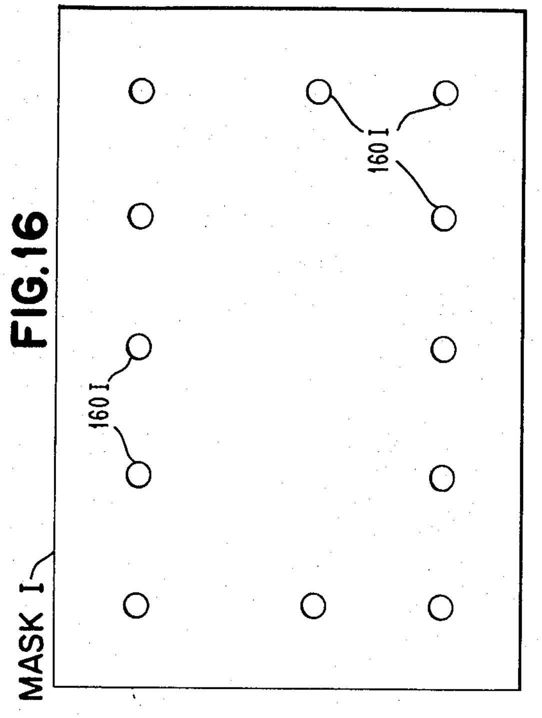

Subsequently, a layer of lead-tin solder is deposited over each gold layer of each terminal hole and, by heat and reflow techniques, a ball of solder is formed on the gold limiting land as the solder will not adhere to or wet the surface of the sputtered insulating layer. Mask I as shown in FIG. 16 is used for the purpose of depositing the lead-tin solder areas. Thus, the pads P of the master slice are formed in this manner to thereby permit electrical contact between the devices—through the lands—to the module. The pads P are designated on the master slice of FIG. 4 as P1, P2, . . . P12 and are designated on the master slice of FIG. 20 as P1, P2, . . . P16. The pads P also permit electrical standoff between the chip and the module.

The wafer is now ready to be tested or, if desired, the wafer is diced into chips and each of the chips are tested electrically.

The integrated circuit chips are mounted on a module having printed conductive lands located thereon. The lands on the module are preferably coated with a lead-tin solder to facilitate interconnection between each chip and the module.

In joining the chips to the module, a joining procedure, described in a patent application entitled, "Circuit Structure and Method," filed June 18, 1965, Ser. No. 465,034, inventor, Lew Miller, and assigned to the same assignee of this invention, is used.

A copending patent application entitled, "Monolithic Integrated Structure Including Fabrication and Package Therefor," which was filed in the name of Benjamin Agusta et al. on Mar. 31, 1966, Ser. No. 539,210, and assigned to the same assignee of this invention provides additional detailed information in fabricating integrated devices of this type. Accordingly, this copending patent application is incorporated herewith by reference.

Pad P.—Although for the purpose of describing the pad P reference is made to a semiconductor configuration wherein a P-type region is utilized as the substrate and subsequent semiconductor regions of the composite semiconductor structure are formed in the conductivity type shown in the drawings, it is readily apparent that the same regions shown in the drawings can be of opposite type conductivities and furthermore, some of the operations which are described as diffusion operations can be made by epitaxial growth and some of the epitaxial growth regions can also be fabricated by diffusion techniques.

Figures 2, 3:
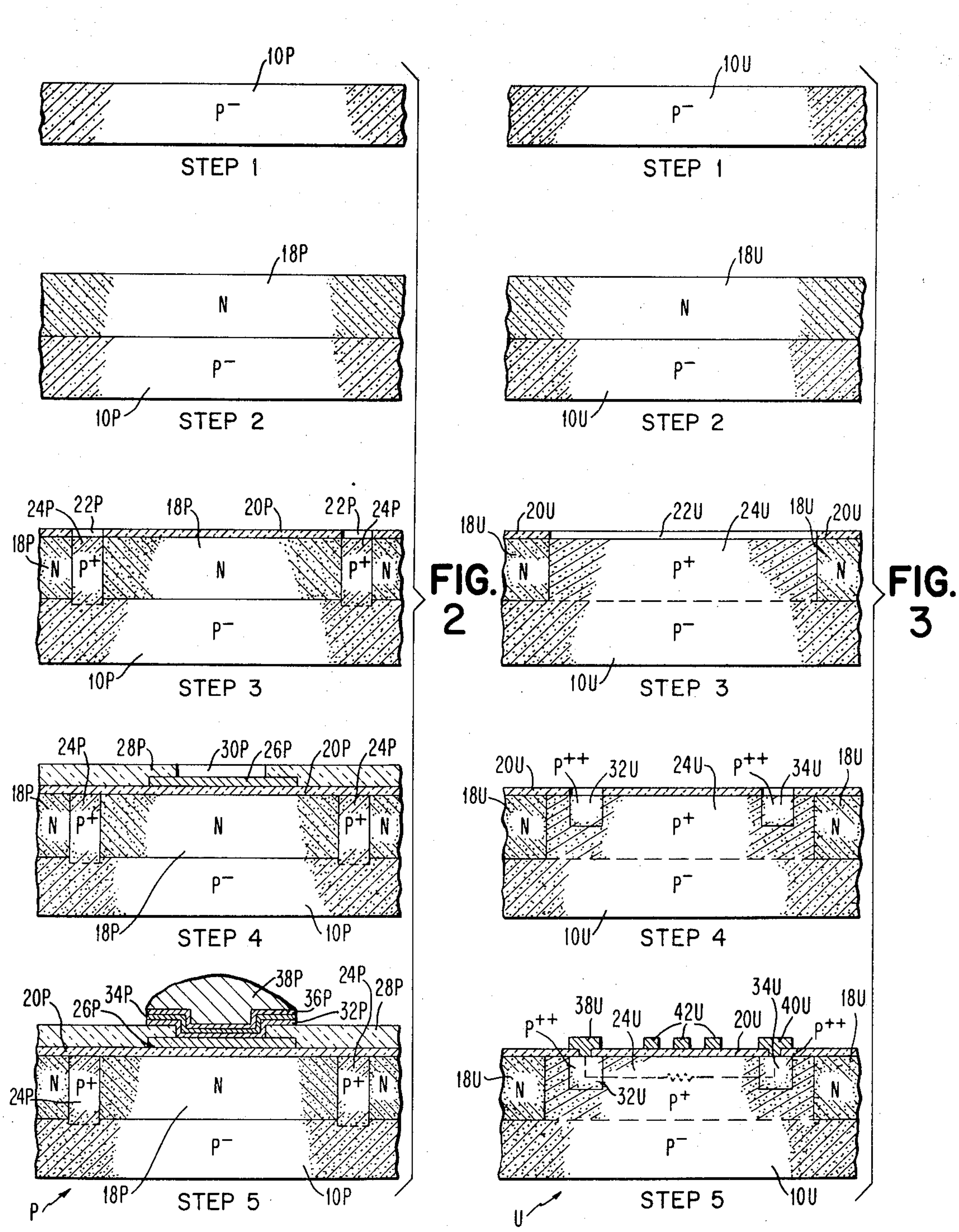
FIG. 2 is a flow diagram, in cross section, depicting the steps in the process for fabricating each pad P of the integrated structure of FIGS. 5 and 6.
FIG. 3 is a flow diagram, in cross section, showing the steps in the process for fabricating the semiconductor underpass conductor U of the master slice of FIG. 4 (FIGS. 4A, 4B)

Referring to FIG. 2, step 1 depicts a substrate 10P of P-type conductivity, preferably having a resistivity of 10 to 20 ohms-centimeter and a thickness of about 10 mils. The substrate 10P is preferably a monocrystalline silicon structure which can be fabricated by conventional techniques such as by pulling a rod-shaped silicon semiconductor member from a melt containing the desired impurity concentration and then slicing the pulled member into a plurality of wafers. The substrate 10P is a portion of one such wafer and has a crystallographic orientation of about 2.5° off the <111> plane in the direction of the <110> plane.

In step 2, a region 18P of N type conductivity, preferably having a resistivity of 0.09 ohm per centimeter, is epitaxially grown on the surface of the substrate. The epitaxial region 18P is an arsenic doped layer approximately $5.5\pm.2$ microns thick.

In step 3, an oxide layer 20P approximately 4000 angstrom units thick is formed on the surface of the epitaxially grown region 18P either by the thermal oxidation process, by pyrolytic deposition, or by RF sputtering techniques. A continuous opening 22P is formed in the oxide layer by standard photolithographic masking and etching techniques using a photoresist layer as a mask and a buffered HF solution to remove the desired oxide portions. The structure is now prepared for the subsequent isolation diffusion operation. A $P^+$ diffusion is now carried out, preferably using a boron source, to form surrounding region 24P in the N type epitaxially grown region 18P. The region 24P has a $C_0$ (surface concentration) of $2.2\times10^{20}$ cm.$^{-3}$ and a sheet resistance of 2.5 ohms per square. It is evident that the $P^+$ isolation diffused region 24P will have a low resistivity surface region which extends downwardly from the surface of the semiconductor structure and the full isolation region extends continuously from the $P^-$ type substrate region 10P to the surface of the semiconductor structure. The depth of the $P^+$ region 24P is approximately 300 microinches.

In step 4, another layer of $SiO_2$ is thermally grown on the substrate surface. A layer of aluminum 26P or other suitable metal such as molybdenum is evaporated over the entire wafer surface and portions of this layer are etched away to produce the desired land interconnection pattern. The evaporated layer of aluminum has a thickness of several thousand angstrom units. A layer of photoresist is then applied to the wafer, dried, exposed, developed, and fixed. The aluminum interconnections are formed by a subtractive etching operation using a warm solution of $H_3PO_4+HNO_3+H_2O$. The photoresist layer is stripped off and the wafer is cleaned and dried. Subsequently, a sputtered of otherwise deposited insulating layer of $SiO_2$ or other form of glass material is formed on the entire wafer surface. Layer 28P designates this encapsulating layer which is provided over the entire wafer surface after the land pattern is formed on the oxide layer. The use of the isolated N-type region 18P is for the purpose of preventing any possible electrical shorts to the $P^+$ isolation region which is all at one electrical potential (reverse-biased) to provide electrical isolation between the devices. Electrical shorts can be created by means of undesired pinhole openings in the oxide layer 20P beneath the land 26P. However, due to the use of the isolated N-type region 18P, shorts of the type described will be of no consequence. An opening 30P is formed over the portion of the land 26P that is located over the electrically isolated N-type region 18P. This opening is made by conventional photolithographic masking and etching techniques using a photoresist layer as a mask.

Referring to step 5, sucessive layers of chromium 32P, copper 34P, and gold 36P are deposited into and about the periphery of the opening 26P formed in step 4. This is carried out using suitable masks for terminal contact formation. Subsequently, a layer of lead-tin solder is deposited over the gold layer 36P and, by heat and reflow techniques, a ball of solder 38P is formed on the land 36P as the solder will not adhere to or wet the surface of the insulating layer 28P. Thus, the pads P of the master slice are formed in this manner to thereby permit electrical contact between the devices—through the lands—to the module. The pads P are designated on the master slice as P1, P2, . . . . The solder ball 38P also permits electrical standoff between the chip and the module.

Figure 4:
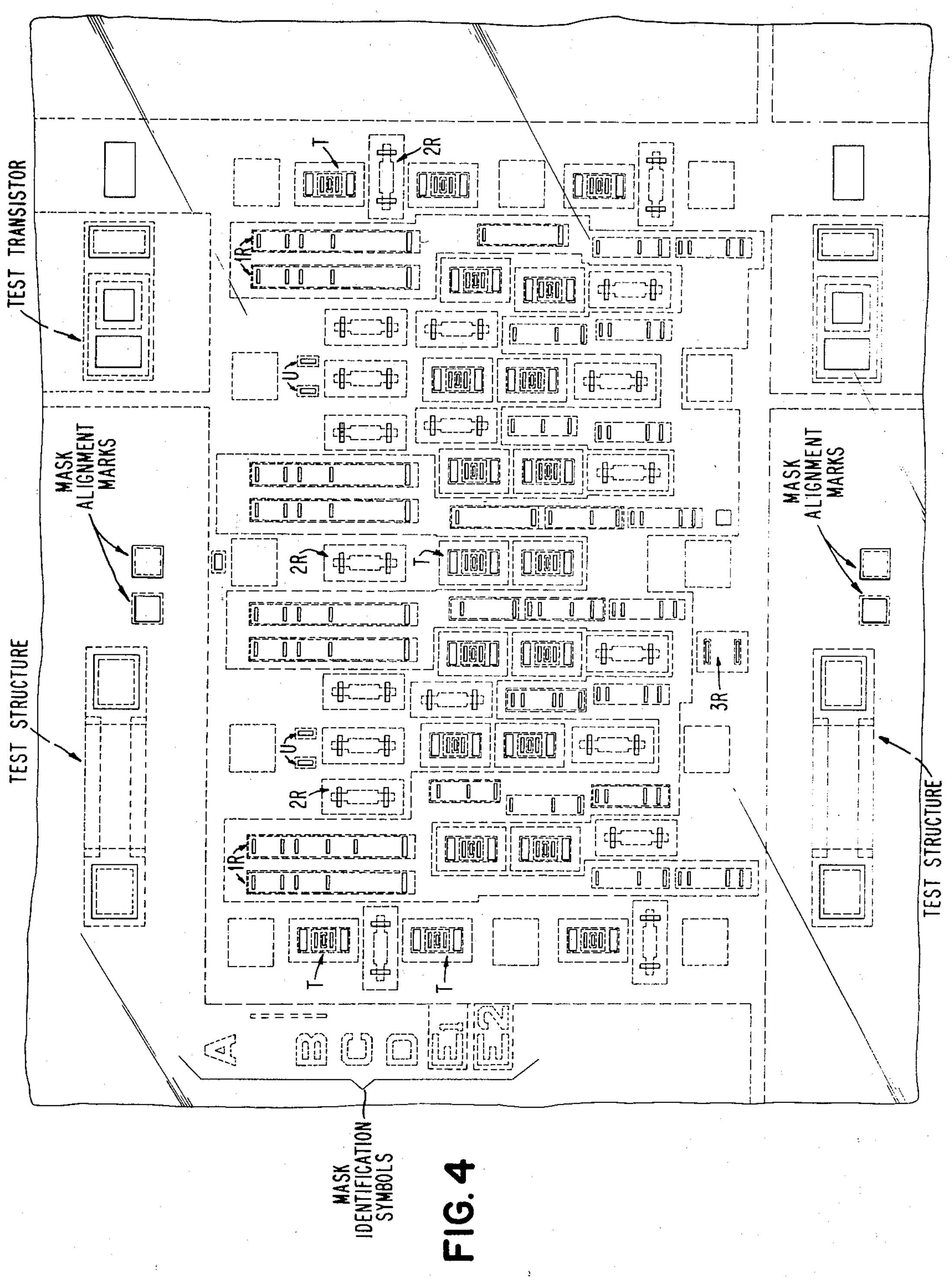
FIG. 4 is a top view of one master slice embodiment of this invention illustrating the location of each component.
Figure 4:
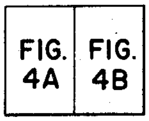
Figure 4A:
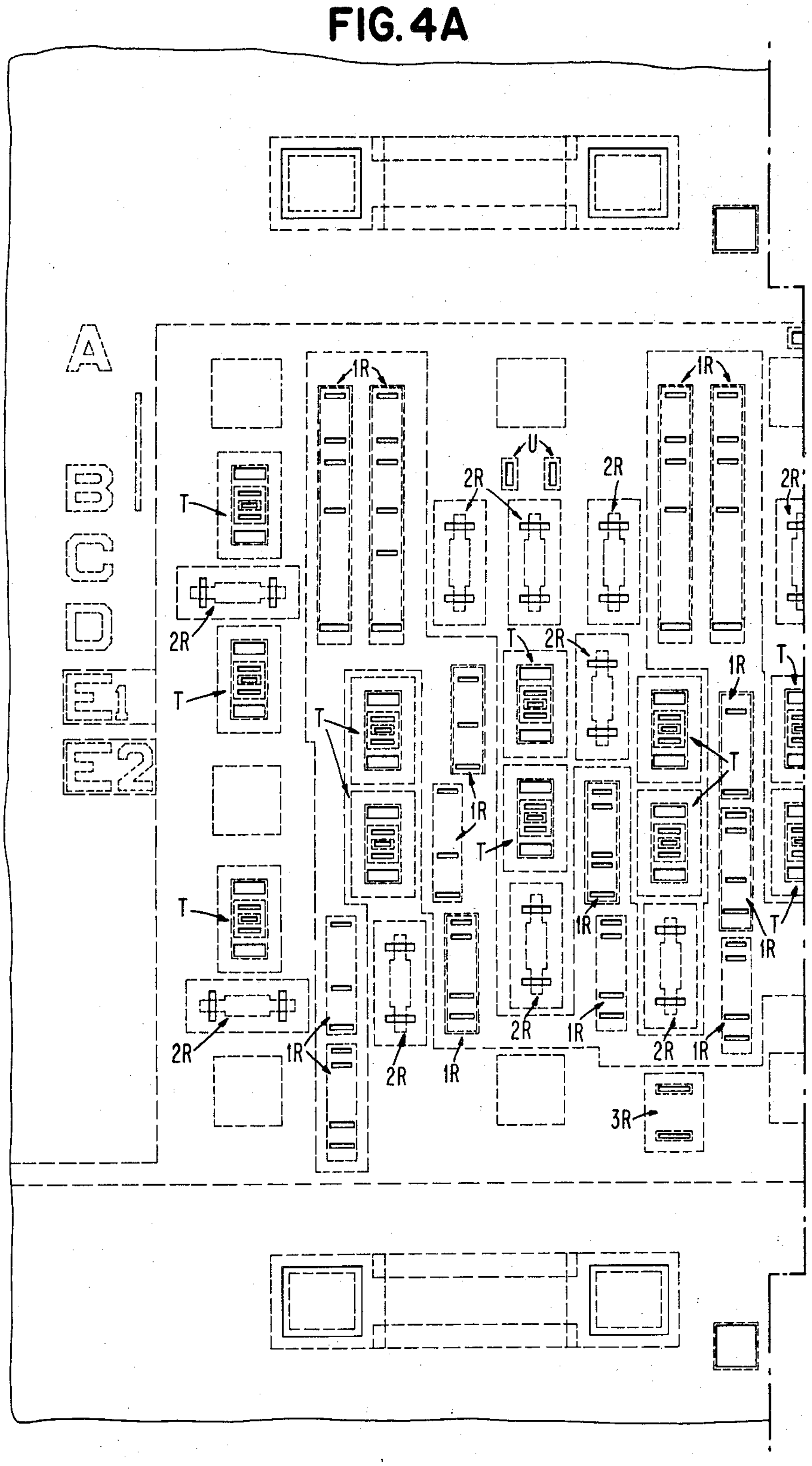
FIG. 4A is an enlarged view of the left hand portion of FIG. 4.
Figure 4B:
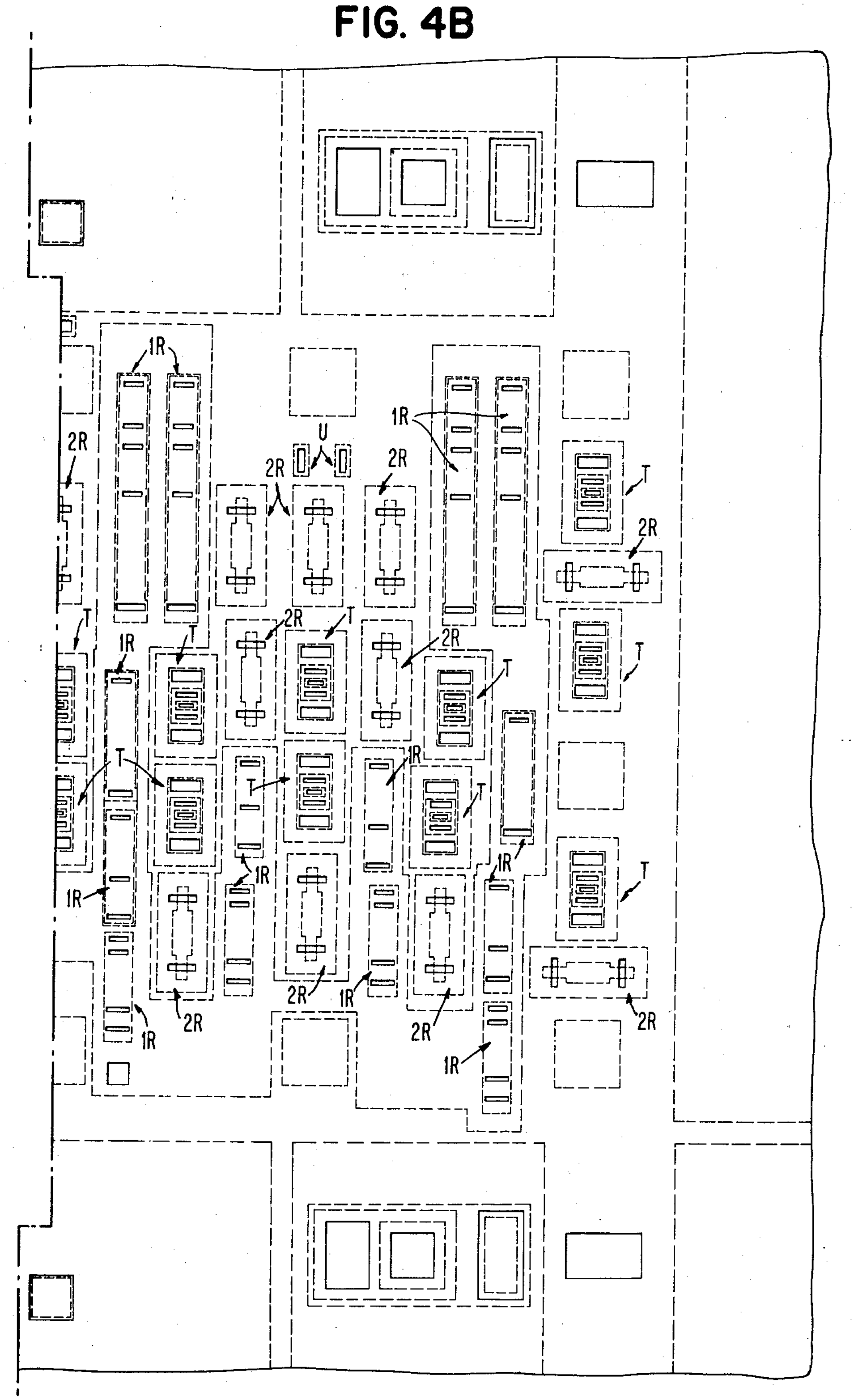
FIG. 4B is an enlarged view of the right hand portion of FIG. 4.
Figure 4D:
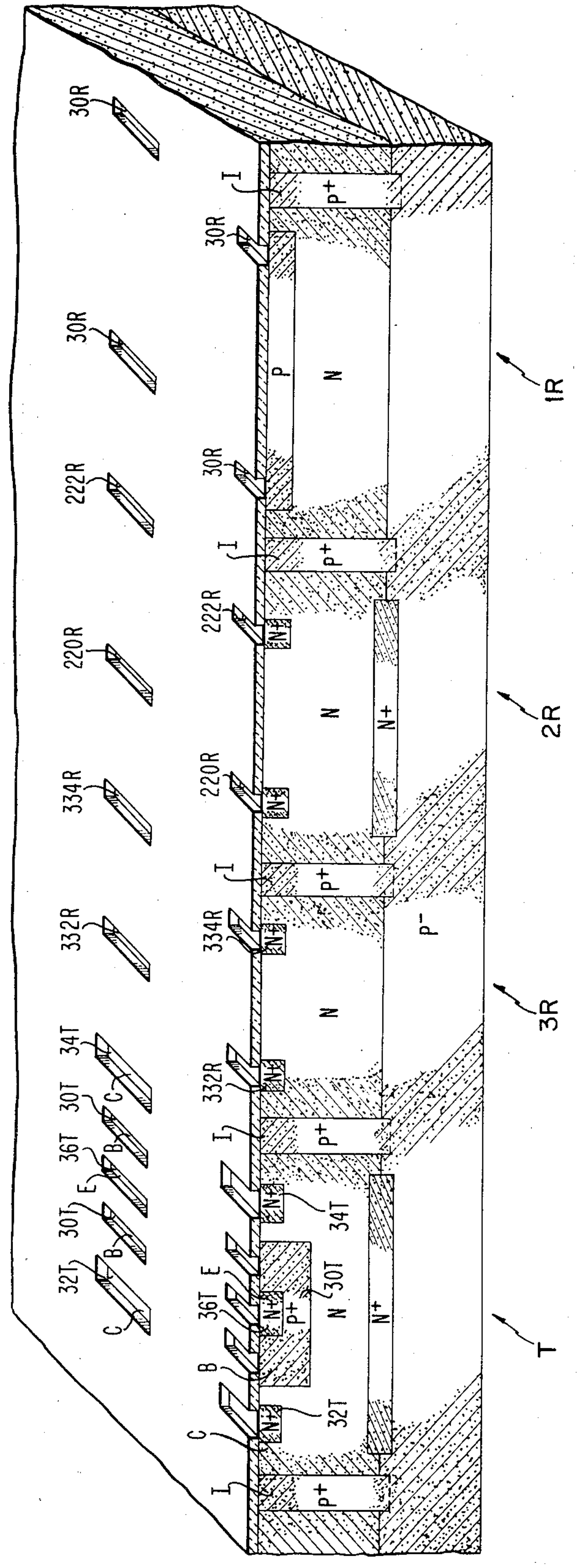
FIG. 4D is an enlarged, fragmentary, sectional perspective view of the components that are used in the master slice of FIG. 4.
Figure 5:
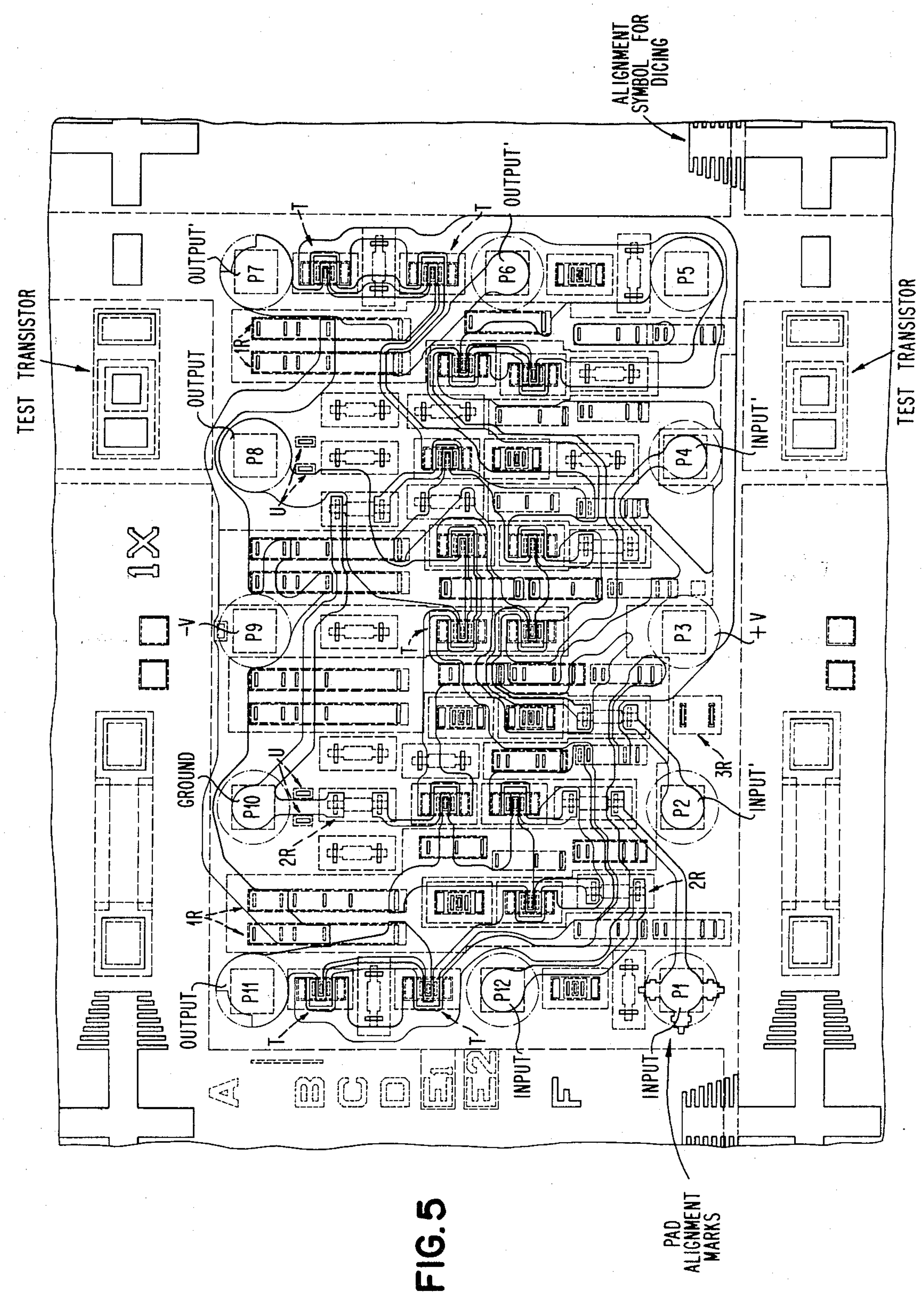
FIG. 5 is a top view of a metallized pattern showing one way of connecting components of the master slice of FIG. 4 to provide a logic type integrated circuit structure as shown schematically in FIG. 1C.
Figure 5:
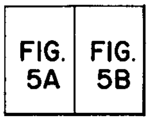
Figure 5A:
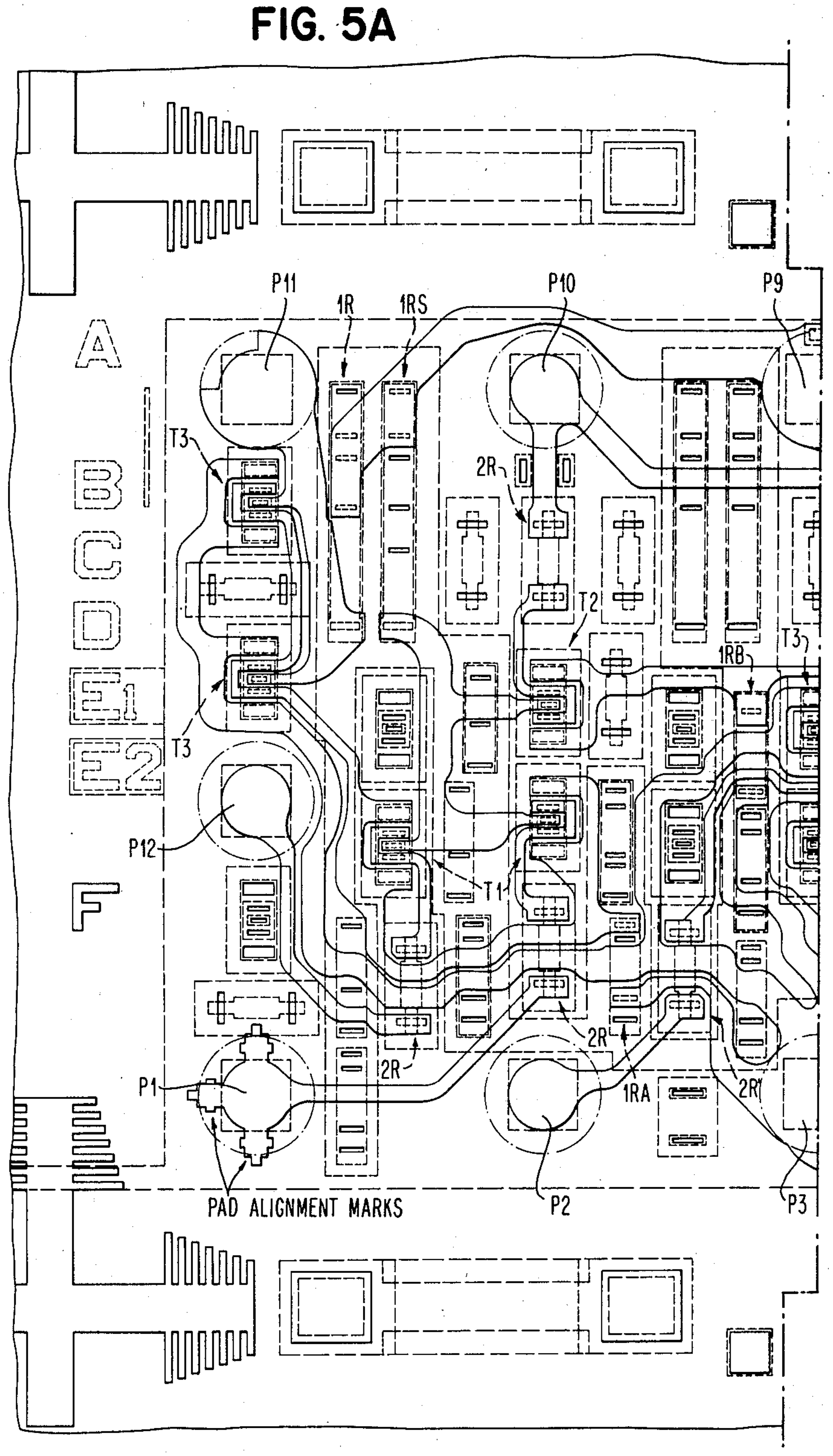
FIG. 5A is an enlarged view of the left hand portion of FIG. 5.
Figure 5B:
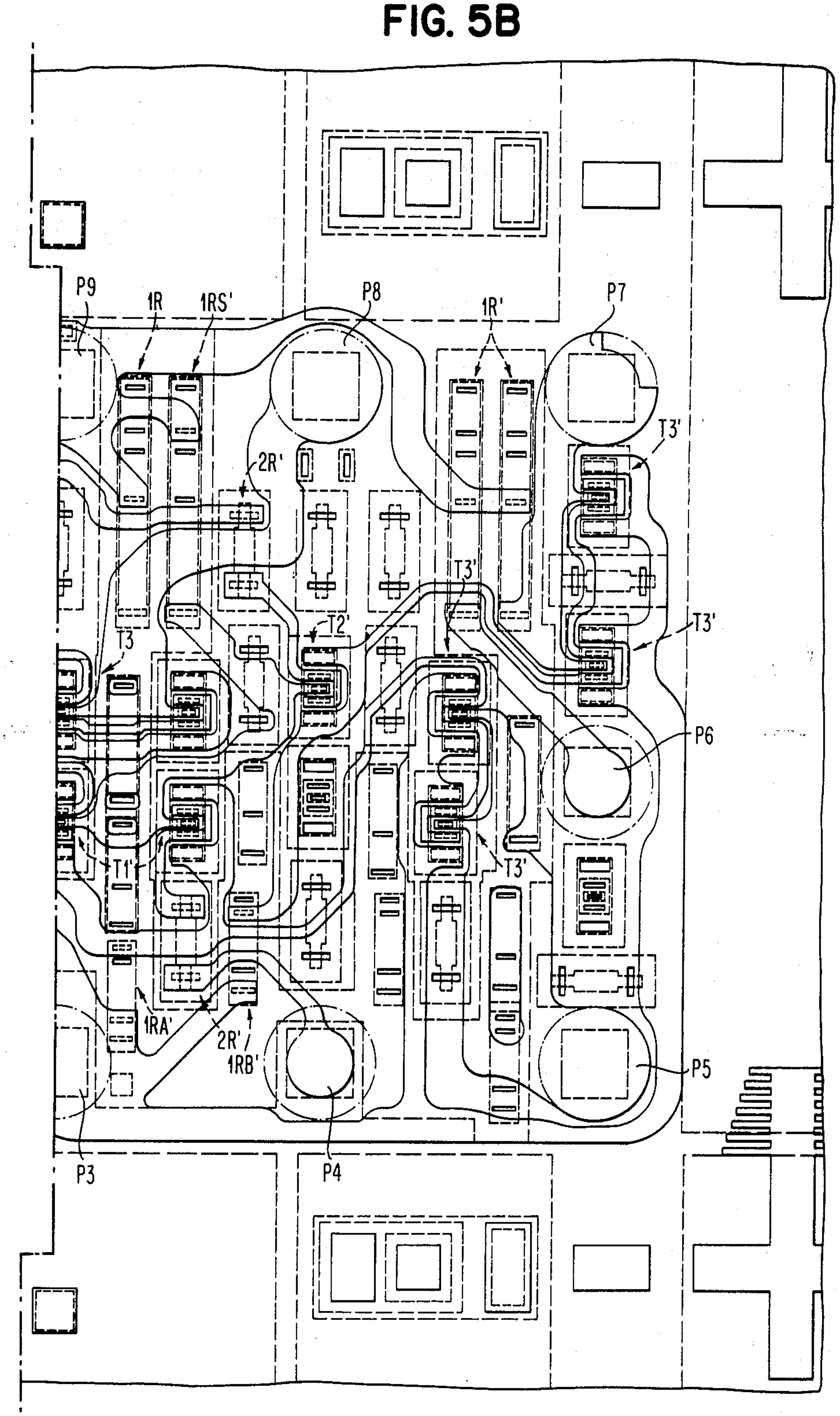
FIG. 5B is an enlarged view of the right hand portion of FIG. 5.
Figure 6:
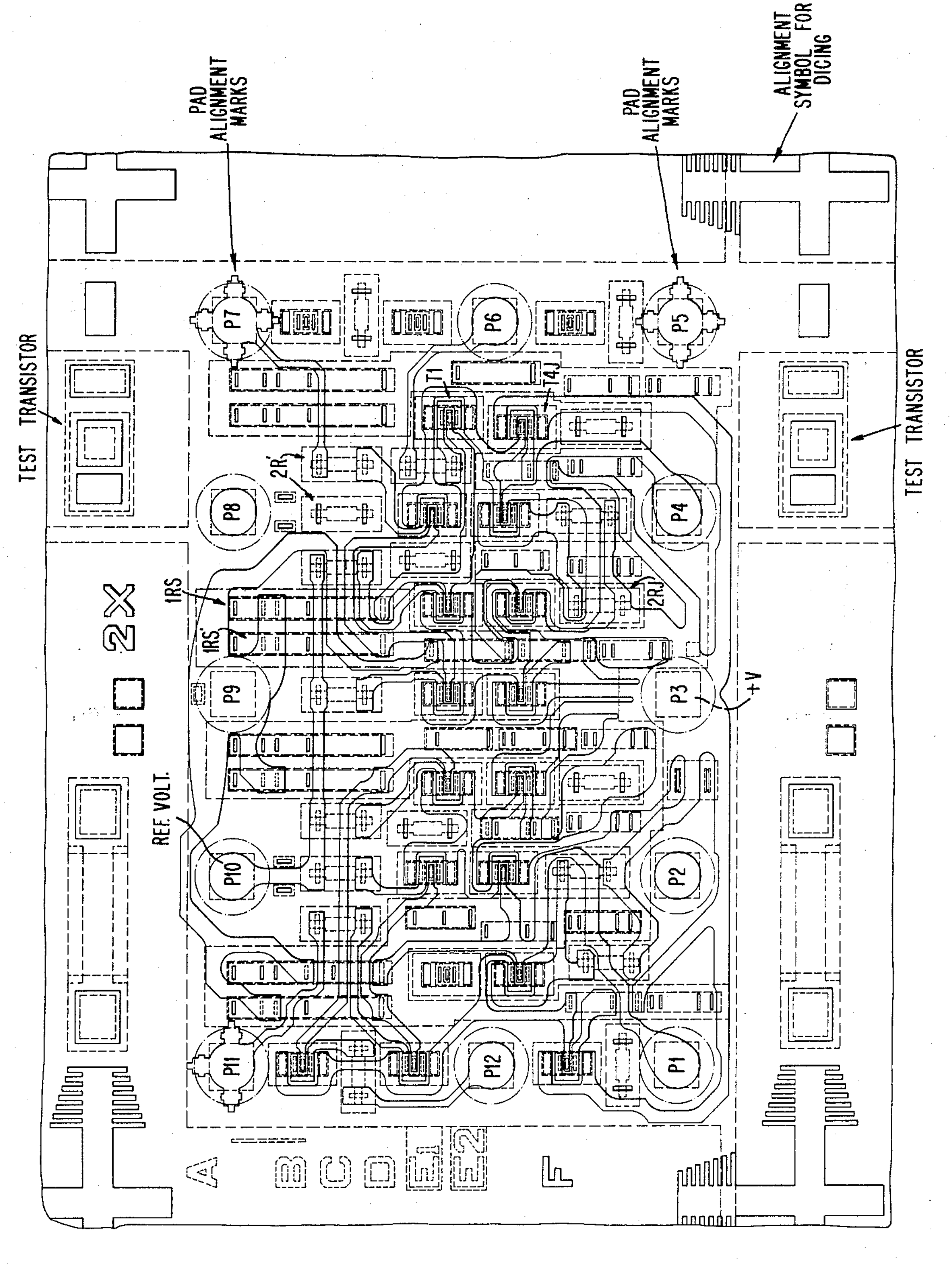
FIG. 6 is a top view of a metallized pattern showing another way of connecting components of the master slice of FIG. 5.
Figure 6:
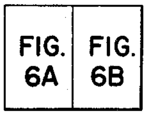
Figure 6A:
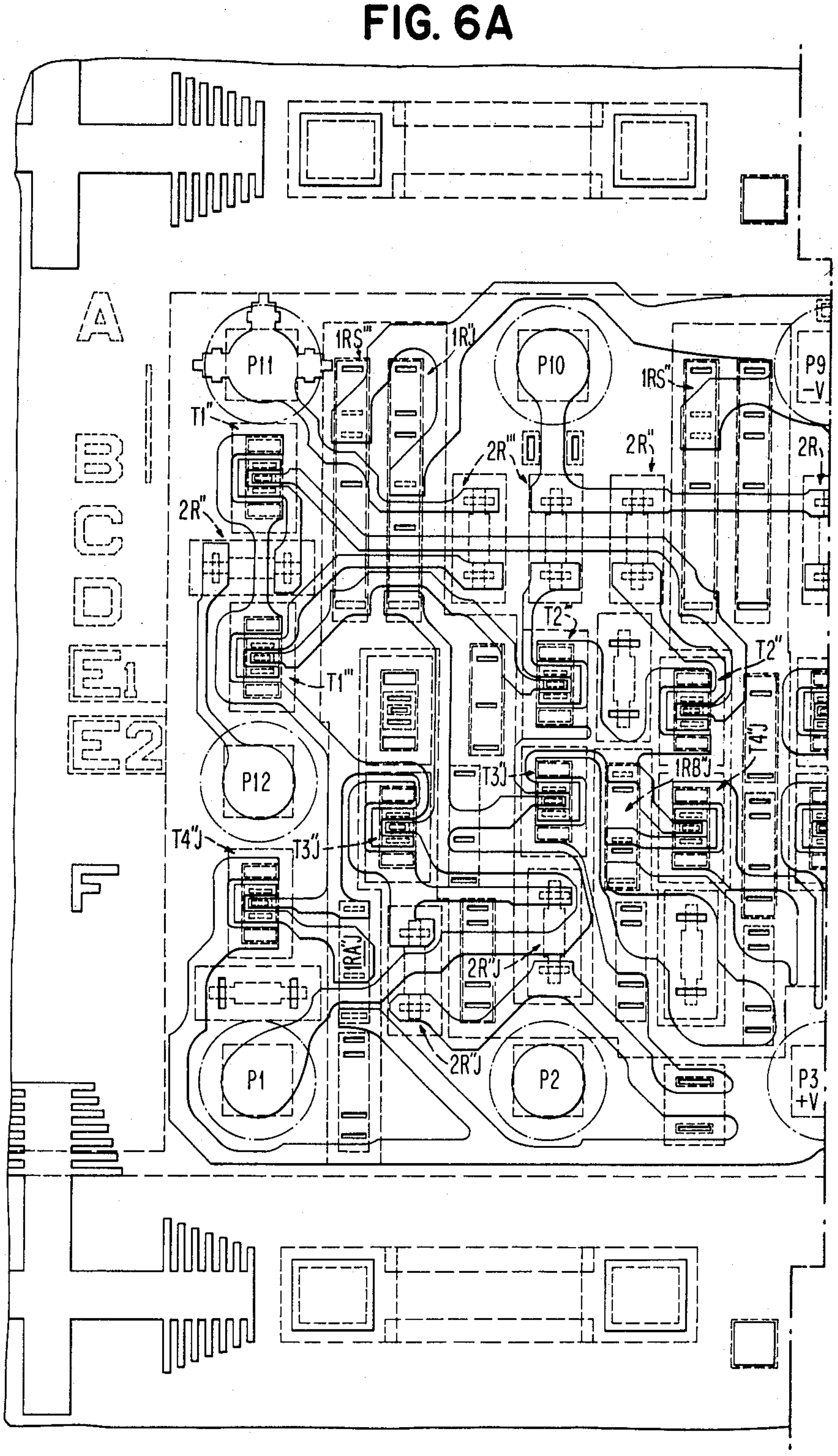
FIG. 6A is an enlarged view of the left hand portion of FIG. 6.
Figure 6B:
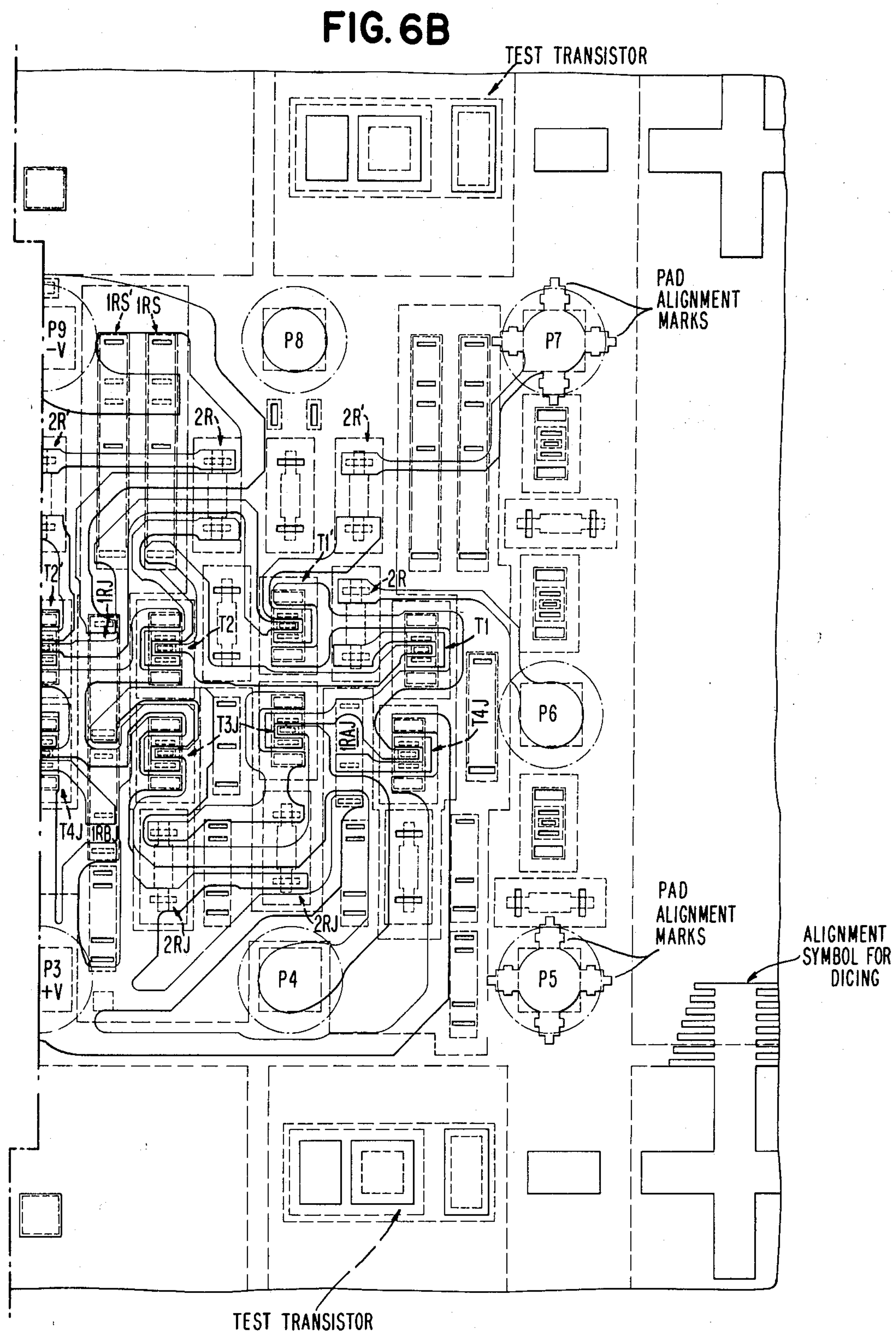
FIG. 6B is an enlarged view of the right hand portion of FIG. 6.

Master chip.—The master chip shown in FIG. 4 and shown in enlarged form in FIG. 4A and 4B which together compose FIG. 4 illustrates how the components identified as T, 1R, 2R, 3R and U are located on a portion of a semiconductor wafer. These components are arranged in a manner so as to permit optimum interconnection to form the desired logic type circuit such as shown in FIG. 5 or 6. It is evident from the master slice configuration that 1R resistors are easily connected to the minus V potential source (pad 9) of the metallized chips of FIGS. 5 and 6. The minus V pad, P9, is centrally located at one edge portion of the master slice so as to permit optimum interconnection between the components that are electrically connected to pad P9. This master slice is designed in a manner so as to permit or facilitate connection of the 1R resistors to the area designated as P9 where the minus V potential is applied. The shorter the line of connection between the 1R resistors and the P9 pad the better the electrical characteristics are for overcoming undesired voltage drops, etc. Furthermore, in this manner of locating the 1R resistors as close as possible to the P9 minus V pad, a minimum number of underpass devices are required to facilitate wiring up of the integrated circuit structure. Still further, the location of the 1R resistors as shown in the master slice of FIG. 4 permits a large degree of freedom in interconnecting a logic type circuit. At least 18 different logic type circuits can be interconnected using the master chip of FIG. 4. This is easily done by selecting the desired metallizing mask F after all the devices are fabricated. Despite the fact that some devices will not be used, this is kept at a minimum by virtue of the arrangement of components as shown in FIG. 4.

Similarly, with reference to FIGS. 4, 5, and 6, the pad P3 which is either ground or plus V is centrally disposed on the master slice at one edge portion thereof. In the case of the embodiments of FIGS. 5 and 6, pads 9 and 3 are both centrally disposed and are located opposite each other so that the minus V potential can be applied to pad 9 and a plus V or ground is applied to pad 3. The devices that have to be connected to the plus V or ground pad P3 are located close to this pad to facilitate interconnection and minimize undesired electrical characteristics.

It is very important in fabricating the monolithic integrated device of this invention to place the 1RA and 1RB resistors of each logic circuit close to the +V pad (pad P3 of FIGS. 5 and 6). This is the most critical resistor for determining the output level of the logic circuit and hence, undesired voltage drops within the line must be avoided. Each 1RA and 1RB resistor of each circuit must have its own individual current path or conductive link to the +V pad. This is necessary since any shared series resistance between any two 1RA, 1RB or combination resistors will result in an undesirable voltage drop across the shared resistor that is not drawing current thereby reducing the voltage level at the output of the emitter-follower. In integrated structures using more than one circuit on a chip, the metallized lands, which are thin films, have an appreciable series resistance. This is not the case with discrete components conventionally wired to fabricate the circuit.

Referring to FIGS. 4, 5, and 6, test structures are identified which are located on the kerl or outer peripheral portion of the master slice. These test structures are useful in permitting non-destructive testing operations to be carried out to test components that are not needed for the integrated circuit and thereby determine whether the itnegrated circuit components are capable of functioning properly. A test structure of the type shown in these figures is described in copending U.S. patent application Ser. No. 364,834, filing date Feb. 24, 1964, inventors, Fred Barson and Walter E. Mutter, and assigned to the same assignee of this invention. In addition, test transistor structures are identified and shown in the kerf portion of the master slice which serve to permit non-destructive testing of the transistor devices that are formed.

A further feature of this master slice is the use of mask identification marks on the left hand portion of the slice which permit the visual identification of the step in the process of the fabrication of the monolithic integrated structure. For example, the letter A indicates that a photolithographic and etching operation using the A mask has been performed. Similarly, the letters B, C, D, E1, and E2 indicate that these photolithographic masking and etching operations have also been performed. In this manner, any person can visually identify the completed step in the fabrication process since each mask letter or corresponding symbol is formed or created at the conclusion of the specific step in the fabrication process. Consequently, no mistakes can be made by redoing a step in the process that has already been carried out as signified by the appropriate mask letter. It should readily be apparent to those skilled in the art that other symbols can be used to indicate the same function. Furthermore, small code letters or numbers can also be used in conjunction with the larger letters to indicate the engineering level so that design and/or process changes in chip fabrication can be monitored and noted permanently on each chip.

When fabricating the metallized structures shown by FIGS. 5 and 6, metallized marks that permit accurate dicing operations to be carried out are located at the four kerf corners of the metallized master slice. These marks are in the form of a saw-tooth configuration with the differences between each saw-tooth mark noting a different dimension so that an operator dicing the wafer can readily identify errors in cutting up the wafer by merely noting which saw-tooth has been cut which thereby indicates the degree of error since each saw-tooth is a fixed distance from the center line running longitudinally through all the saw-teeth of a single alignment mark. The metallized pattern shown in FIGS. 5 and 6 utilizes the F symbols to designate that the metallized F mask has been used. A further metallized symbol, 1X (FIG. 5), 2X (FIG. 6), is applied to the metallized master slice to designate the type of circuit that has been fabricated. This symbology is extremely useful in preventing errors in assembling or mounting integrated devices onto a module. Furthermore, this symbology permits relatively untrained people to perform various operations without making errors because of the use of a visual identification mark.

A further very useful alignment symbol is the metallized marks which are 90° apart located on one or more of the corner pads. These marks facilitate photolithographic masking and etching operations that are carried out in connection with the G mask which is used to make openings in a sputtered glass layer to permit subsequent terminal metallurgy to be deposited to form all of the terminal pads P1–P12. These marks are also useful to align the metal masks 11 and 1 that are used in making terminal contacts. The degree of misalignment of the masks is indicated by the shape of the mark which functions like the saw-tooth mark used for dicing. Without these alignment marks on the corner pads, it is difficult to line up all of the pads to insure the formation of accurate terminal contacts to all of the pads.

As can be seen by reference to FIG. 4, each master slice or chip has pad areas spaced substantially equally distant from each other with the exception that a longer space is provided between two pair of pad areas for each master chip. Referring to FIG. 4, a longer space is provided between pad areas 6 and 7 and pad areas 11 and 12 that the space provided between any other pair of pad areas. The reason for this pad area location configuration is to facilitate mechanical handling of the completed integrated chips with an enlarged slot provided across each integrated device. The slot is defined by the space between pads 6 and 7 and 11 and 12 of the integrated device made from the master chip of FIG. 4. Hence, these enlarged slots for the integrated devices of the FIG. 4 and FIG. 20 embodiments facilitate orientation, location, and feeding of the integrated chips to equipment for properly placing the chips onto a module using the enlarged space for chip placement purposes.

Figure 17:
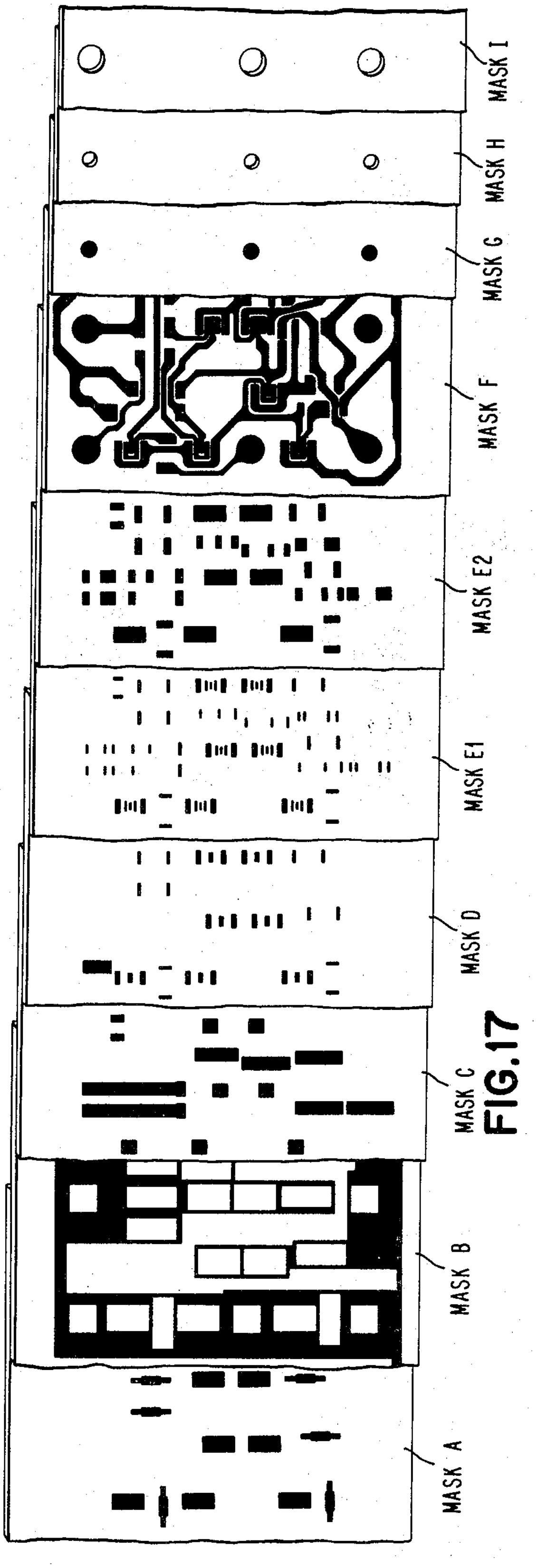
FIG. 17 is a fragmentary, exploded, perspective view of a portion of each mask of FIGS. 7–16 shown in an overlay arrangement.

Masks—FIGS. 7, 8, 9, 10, 11, 12, 13, 14, 15 and 16 show the glass and metal masks that are used in fabricating one monolithic integrated structure of this invention. FIG. 17 illustrates how the masks are placed in alignment in the manner shown during successive photolithographic masking operations.

FIG. 7 is an enlarged view of mask A which is primarily used for sub-collector diffusions for the active and passive devices. The dark patterns in all the glass masks (FIGS. 7–13) serve to prevent light from striking a photosensitive emulsion that has been coated on the wafer. Hence, polymerization of the areas of the wafer shielded by the dark areas of the mask is prevented and therefore, these shielded areas are removed during developing. However, the lightstruck photosensitive areas of the photoresist layer are not removed so as to act as a mask to prevent subsequent chemical etching of the oxide beneath these portions of the photoresist layer. Black boxes CT represent the sub-collector diffused areas for the transistor devices. Black marks identified as C2R represent the sub-collector regions for the 2R resistors. Alignment mark 70A adjacent the mask designation mark A is a standard line used on all masks to check each mask for line dimension accuracy. Two alignment squares identified as AS are used for mask alignment purposes. One of these squares is always larger than the other square to permit the next mask to be aligned properly. The next mask reverses the sizes used for the alignment squares of the previous mask, etc. The sub-collector for dumbbell or base width test structure is identified as CTS and the sub-collector for the large test transistor is identified as CTT.

Referring to FIG. 8, this is mask B for isolation-diffusion. The black area is the $P^+$ isolation diffusion. From this mask, it is clear that all the 1R resistors have a common N bed or region as designated by reference N1R.

FIG. 9 depicts the mask C for P-type or base type diffusions. Reference numeral 10C identifies the rectangular black boxes which represent the P-type diffusion used to make the 1R resistor device. Reference numeral 12C identifies the square black boxes that define the base diffusion for the transistor devices. Reference numerals 14C and 16C identify the base regions formed in the "dumbbell" or test structure and the test transistor, respectively. Reference numeral 18C identifies a diffused region that is performed on the isolation regions of the test transistor to keep the oxide thickness at that region the same as the oxide thickness over the base region to facilitate contact hole formation. Reference numeral 20C identifies the diffusion which permits the formation of contact to the P-type isolation from the negative voltage supply. Reference numeral 22C identifies the diffused region for the $P^{++}$ regions of the underpass of FIG. 3.

Referring to FIG. 10 (mask D), reference numerals 10D represent the emitter regions for the transistor. Numerals 12D represent the two collector contact regions for each transistor Numerals 14D and 15D repesent the two diffusion areas for providing electrical contact to the N-type epitaxial region of each 2R resistor. Reference numeral 16D identifies the two $N^+$ contact regions to the 3R resistor. Reference numeral 18D identifies the $N^+$ contact to the common N epitaxial region of all 1R resistors. Numeral 20D represents the emitter type region of the "dumbbell" test structure. Numerals 22D and 24D identify emitter and collector contact regions of the test transistor.

Referring to FIG. 11, mask E1 is used for forming the contact holes. Reference numeral 10E1 depicts the region on the mask which is used to form the isolation contact hole. Reference numerals 12E1 depict the dark areas on the mask used to form the two contact holes for the base regions of each transistor. Reference numerals 13E1 depict the dark areas on the mask used to form the two contact holes for the collector regions of each transistor. Reference numerals 14E1 represent the dark areas on the mask used in the formation of the contact holes for the emitter portion of each transistor. Reference numerals 16E1 depict the dark areas on the mask used in the formation of the contact holes for the 3R resistor. Reference numeral 18E1 depicts the dark region on the mask used to form the contact hole for the emitter portion of the test transistor device. Reference numeral 20E1 depicts the dark area on the mask used in the formation of the contact hole to the collector portion of the test transistor. Reference numerals 22E1 depicts the dark area on the mask used in the formation of the contact holes for the base portion of the test transistor device. Reference numeral 24E1 is the contact hole for the isolation region of the test transistor. Reference numeral 26E1 depicts the dark areas on the mask used in the formation of contact holes to the "dumbbell" test structure. Reference numerals 28E1 depict each of the two dark areas on the mask used in the formation of contact holes to the 2R resistors. Reference numerals 30E1 identify the U underpass contact holes. Reference numerals 32E1 point out the dark areas on the mask used in the formation of contact holes for the 1R resistors.

Referring to FIG. 12, block out regions for reducing alignment problems are shown in the E2 mask. Black boxes blocking out the transistor area insure pinhole free oxide films while facilitating alignment of the two E masks. The E2 mark on this mask is permitted because of black box directly beneath the E1 mark on mask E1 of FIG. 11.

With reference to FIG. 13, mask F is shown for the metal interconnections. The dark areas in the mask are used to permit the formation of an aluminum land pattern corresponding to the dark portions of the mask. This aluminum land interconnection pattern serves to interconnect the various portions of the monolithic integrated structure and also serves to provide contact to the test structure. The saw-tooth dicing marks are also formed by this F mask. This F mask interconnects the compounds as shown by FIG. 6.

Referring to FIG. 14, a mask G is shown for the formation of terminal holes in the sputtered glass (silicon dioxide) layer that is formed on the aluminum interconnection land pattern. Reference numerals 140 G depict the dark areas on the mask which permit the formation of terminal holes to the terminal pad regions of the monolithic integrated structure. All the masks depicted in FIGS. 7, 8, 9, 10, 11, 12, 13 and 14 are made of glass having the dark opaque regions thereon.

With reference to FIG. 15, a metal mask H is shown to permit the formation of Cr-Cu-Au limiting lands by means of openings 150H. As is evident from inspection of FIG. 15 with respect to FIG. 14, the Cr-Cu-Au limiting lands for the chips are formed over the terminal holes formed in the sputtered glass layer.

Referring to FIG. 16, the final metal mask I is shown for forming the monolithic integrated structure. The mask of FIG. 16 is for permitting the formation of Pb-Sn pads. Reference numerals 160I depict the holes in the mask which permit the formation of the Pb-Sn pads over the Cr-Cu-Au limiting lands formed on the chip. As is noted from inspection of FIG. 16 with reference to FIG. 15, the holes 160I of FIG. 16 are much larger in diameter than the holes 150H in FIG. 15 which is necessary for the lead-tin pad reflow operation described in the section entitled "Fabrication Method."

With reference to the mask overlay view of FIG. 17, partial views depict a corner portion of each mask shown in full in FIGS. 7 through 16. FIG. 17 shows how portions of the masks are aligned with respect to each other to provide an understanding of the manner in which the monolithic integrated structure of FIG. 6 is formed. Similarly, other suitably designed masks can form the meallized integrated structures of FIGS. 5 and 21,, from the master slice of FIGS. 4 and 20, respectively.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a process for fabricating a monolithic integrated semiconductor chip, the steps of:

masking the surface of said chip to provide selectively exposed portions of surface area;

etching away material from the selectively exposed portions of surface area;

repeating said steps of masking and etching a plurality of times, with diverse masks providing different portions of selectively exposed surface area; and forming a mark on said chip during each masking and etching operation symbolic of the particular operation performed.

2. The process of claim 1, including the steps of:

forming metallized identification marks on said chip during a metallizing operation for interconnecting devices on said chip.

3. The process of claim 1, including the step of depositing metallized marks 90° apart on at least one corner terminal pad.

4. In a process as in claim 1, the step of depositing a metallized dicing mark indicator adjacent the corner pads of said chip.

5. In a process for fabricating a monolithic integrated semiconductor chip, the steps of:

forming spaced terminal pads in a parallel-sized configuration with two adjacent spaced pads located on each side of two opposite parallel sides of said chip being spaced further apart than the space between any other pair of adjacent pads;

such that when said semiconductor chip is placed on a mechanical handling conveyor, said chip is oriented on said conveyor in accordance with an enlarged slot provided by the particular spacing of the terminal pads in the parallel-sided configuration in accordance with said forming step.

References Cited

UNITED STATES PATENTS 3,171,741 3/1965 Meyer ............ 96—38.4 X

ALFRED L. LEAVITT, Primary Examiner

K. P. GLYNN, Assistant Examiner

U.S. Cl. X.R.

29—624; 96—38.4; 156—17